United States Patent [19]

Champion

[11] Patent Number: 4,839,394

[45] Date of Patent: Jun. 13, 1989

[54] FILLERS FOR USE IN CASTING MARBLE PRODUCTS

[75] Inventor: Clive A. Champion, Oakville, Canada

[73] Assignee: Watercolour Bath Products, Inc., Ontario, Canada

[21] Appl. No.: 925,754

[22] Filed: Oct. 30, 1986

[51] Int. Cl.$^4$ ................................................. C08J 9/32
[52] U.S. Cl. ........................................ 521/55; 521/54; 523/179; 523/218; 523/219
[58] Field of Search ................... 521/54, 55; 523/179, 523/218, 219

[56] References Cited

U.S. PATENT DOCUMENTS

| | | | |
|---|---|---|---|
| 3,553,002 | 1/1971 | Haraway, Jr. et al. | 523/219 |
| 3,873,475 | 3/1975 | Peachacek | 523/219 |
| 4,031,059 | 6/1977 | Strauss | 523/179 |
| 4,077,921 | 3/1978 | Sharpe et al. | 523/179 |
| 4,485,192 | 11/1984 | Gibbs et al. | 523/219 |

*Primary Examiner*—Morton Foelak
*Attorney, Agent, or Firm*—Bell, Seltzer, Park & Gibson

[57] ABSTRACT

A filler composition for mixing with a resin to form a castable marble-like product comprises an inorganic filler material, such as calcium carbonate in powdered form admixed with components which considerably reduce the density of the cast product. The weight reducing components may be hollow ceramic spheres in combination with hollow plastic spheres. The plastic spheres have an average diameter significantly less than the average diameter of the ceramic spheres. The plastic spheres act as cushion to minimize break up and degradation of the ceramic spheres. When the filler composition is admixed with a resin, the resultant cast product is considerably lighter than existing cast marble-like products.

15 Claims, No Drawings

FILLERS FOR USE IN CASTING MARBLE PRODUCTS

FIELD OF THE INVENTION

This invention relates to filler compositions for mixing with resins to form a castable product which may simulate marble.

BACKGROUND OF THE INVENTION

Shaped marble products are used widely for a variety of purposes, such as plumbing products which include sinks, toilets, bathtubs, shower stall bases and the like; decorative mouldings; wall panels; and shelving systems to name only a few. To form these products out of solid marble is usually expensive and unsanitary. Cast marble products have become a viable substitute for natural marble where the desired article may be formed by casting and setting a marble-like composition in a mold. By casting the product, greater flexibility in design is permitted and the surfaces are finished in a manner which provides sanitary surfaces. Commonly, various types of granulates especially of calcium carbonate admixed with an appropriate setting resin have been used in forming molded products particularly in the plumbing industry. The problem, however, in casting marble-like compositions to form these products is that the resultant product is very heavy. For example, a bathtub formed in this manner may weight in excess of 500 pounds, therefore, resulting in difficult installation procedures.

In an attempt to reduce the weight of the cast marble product, attempts have been made to incorporate in the marble product various types of glass spheres. However, the glass spheres tend to break up or dissolve during mixing of the mineral filler such as calcium carbonate with the resin. Hence there is very little reduction in weight of the product and furthermore the product tends to loose structural strength due to the break-up of the glass spheres.

According to this invention, a filler composition has been developed which results in a cast marble product weighing considerably less than existing types of cast marble products, yet maintaining desired structural characteristics.

SUMMARY OF THE INVENTION

According to an aspect of the invention, a filler composition for mixing with a resin to form a castable product comprises an inorganic filler material in powder form admixed with essentially hollow ceramic spheres and essentially hollow plastic spheres. The plastic spheres have an average diameter significantly less than an average diameter of the ceramic spheres.

According to another aspect of the invention, sufficient plastic spheres are present in the composition to cushion the ceramic spheres and thereby minimize break-up of the ceramic spheres during handling, mixing and casting of the filler composition.

According to another aspect of the invention, a cast product comprises a filler composition of the above admixed with a color pigment and set with a resin such as an unsaturated polyester resin. The inorganic filler material may be calcium carbonate having granular elongate crystals. The elongate crystals of calcium carbonate as bonded by the resin increases tensile strength of the cast product.

DETAILED DESCRIPTION OF THE PREFERRED EMBODIMENT

Cast products formed by mixing a mineral filler with a resin has a variety of applications. The selection of the particular mineral to be mixed with the resin depends upon the type of product to be cast. The preferred embodiment of this invention will be described with respect to casting of marble-like products commonly used in bathroom and other types of plumbing fixtures. In this field of application, calcium carbonate is the principal source of the inorganic filler. The calcium carbonate is used in powder form and has a crystalline structure which tends to be granular and elongate in shape. Normally the mixing of such mineral fillers with a suitable resin results in a very heavy product. This may be acceptable in products such as short countertops; however, considerable weight is added when the material is cast in the shape of bathtubs.

It has been found that the combined use of ceramic spheres with plastic spheres of considerably smaller diameter can be mixed with the mineral filler to provide the preblend. When the preblend is mixed with a suitable resin and cast into the desired shape, it has been found that there is considerable weight reduction and in some instances may be in the range of 50%. This reduces shipping and handling costs substantially as well enabling people working with the products to handle them in a more careful manner with ease. For example, a bathtub which may weigh normally in the range of 500 to 600 pounds, with this composition may only weigh in the range of 250 pounds. This considerably facilitates the installation of the tub in the bathroom.

The ceramic spheres are available in a variety of configurations. The preferred source of ceramic spheres is that sold under the trade mark SG by P.A. Industries of Tennessee. The ceramic spheres tend to be hollow spheres in structure where the shell thickness is approximately 10% of the sphere diameter. The diameter of the spheres range from approximately 10 microns up to 350 microns. The average sphere diameter is approximately 100 microns. The spheres have a specific gravity of 0.70 and a bulk density of 25 pounds per cubic foot. The melting point of the spheres is in the range of 1200° C. The spheres will withstand external pressures of up to 5000 psi before break-up. The hardness of the spheres is in the range of 5 on the Mohn scale. The spheres consist principally of silicon dioxide, aluminum oxide and ferrous oxide. It is appreciated, of course, that not all types of ceramic spheres, which are usable with this invention, are hollow in nature and may instead be of a porous type having similar specific gravity and bulk density.

The plastic spheres, which are used in combination with the ceramic spheres, are preferably very light and may have a specific gravity in the range of 0.014. It is appreciated that the spheres are formed from a plastic which maintains integrity in the size range of approximately 3 to 5 microns in diameter. The preferred type of plastic spheres are that sold under the trade mark EXPANCEL and are available from Expancel which is a Kema Noble company of Sundsval, Sweden. The microspheres are formed with a polymeric shell with enclosed blowing agent. The spheres have a plastic shell predominantly of the polymer polyvinylidenechloride $(C_2H_2Cl_2)_n$. The blowing agent is normally isobutene. When the mixture is heated, the spheres are formed, all of approximately 3 to 5 microns in diameter. It is appreciated, of course, that other diameter of plastic spheres are usable. The main criteria is that the plastic spheres should be significantly smaller in diameter compared to the ceramic spheres.

The presence of the combined use of ceramic and plastic spheres increases resistance in the cast product to thermal shock. This is particularly important with products exposed to extremes in hot and cold temperatures; i.e. bathtubs. At the same time, the presence of the spheres adds to the thermal insulative aspect of the product so that heat loss from the product, when containing hot liquids, is decreased. The presence of the ceramic and plastic spheres also decreases effort required in not only handling the product but also drilling, trimming and finishing of the product.

A sufficient amount of plastic spheres is used in the filler composition to act as shock absorbers in surrounding and being adjacent the ceramic spheres. By virtue of the plastic spheres being considerably smaller in diameter than the ceramic spheres, many plastic spheres can envelope or at least cover a major percentage of the ceramic sphere surface and cushion the spheres as the preblended combination of mineral and synthetic ingredients is mixed with resin and cast into the desired product. By preventing break up of the ceramic spheres, the structural integrity of the cast product is maintained while significantly reducing the weight of the product. It has been experienced by the combined use of this type of ceramic sphere with plastic sphere, a weight reduction of approximately 50% compared to existing types of cast marble products using resin with mineral filler can be achieved.

The plastic spheres, particularly when made of polyvinyldichloride, carry an electric charge which results in an electrical attraction of the plastic spheres to the surface of the ceramic spheres. This ensures that the plastic spheres remain about or on the surface of the ceramic spheres during blending of the materials, handling and mixing with resin. As a result, the plastic spheres do not float away from the product mix.

The preblended composition for the filler comprises by weight:

(1) approximately 70% to 80% of calcium carbonate;
(2) approximately 17% to 27.5% of ceramic spheres;
(3) approximately 2.5% to 3.0% of plastic spheres;

The preferred composition, according to this embodiment of this invention, comprises 75% by weight of calcium carbonate; 22% by weight of ceramic spheres and 3% by weight of plastic spheres. The calcium carbonate powder, as used in the preferred composition, has the following screen analysis on a percent retained cumulative basis:

40 mesh—0.13%
50 mesh—3.08%
60 mesh—8.95%
70 mesh—16.30%
100 mesh—13.67%
200 mesh—54.42%
325 mesh—74.30%

The resultant filler composition, according to a preferred embodiment of this invention, has the following screen analysis on a percent retained cumulative basis:

30 mesh—0.039%
40 mesh—0.43%
50 mesh—5.80%
60 mesh—14.76%
70 mesh—24.50%
100 mesh—33.94%
200 mesh—66.16%
325 mesh—90.71%

This preblended combination of mineral and synthetic ingredients may be blended with a suitable resin on a batch basis to obtain optimum strength per weight ratio or in combination with other fillers to produce unique blends if required. The materials may be blended in any size of mixer to allow flexibility in manufacturing without change in existing casting methods. Suitable resins are those already commonly used in the field of cast marble products, such as the unsaturated polyester resins to which a catalyst is added to set the resin in forming the solid cast product.

It is appreciated that depending upon the end use for the castable composition, various consistencies will be desired. Generally however, the preblended filler material can be mixed with the resin for use as follows. A known amount of resin is placed in the mixer. A weighted amount of preblend is then added slowly to the resin while mixing until the consistency is suitable for the particular casting application. The left-over preblend is then weighed to determine the weight of preblend added to the mix. While continuing mixing, catalyst is added to the mixture to commence reaction in the resin to set the composition. The amount of catalyst added is based on the original amount of resin placed in the mixture. Once catalyst is distributed throughout the resin, the thick mixture is removed from the mixer and cast in a mold in the usual way. When desired, a gel coat may be applied to the surface of the mold before the mixture is added to the mold to provide the desired surface finish on the product.

The preblended composition, according to this invention, does not require any special equipment for handling or mixing nor any special resins for setting. The process to be followed in mixing the resin is essentially the same as that already used. Hence without any special requirements, the preblended combination of mineral and synthetic ingredients of this invention for cas marble products provides the significant advantage in weight reduction which may be as much as 50% or more. In addition, the overall structural, tensile and thermal strength of the product is enhanced by the combined use of the ceramic and plastic spheres with granular elongate type crystals of calcium carbonate which, when set with the resin, is provided.

Although preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. A filler composition for mixing with a resin to form a castable product, said filler composition comprising an inorganic mineral filler material in powder form admixed with hollow ceramic spheres of a diameter ranging from 10 to 300 microns and hollow plastic spheres having an average diameter of approximately 3 to 5 microns.

2. A filler composition of claim 1, wherein said plastic spheres are made of polyvinylidenechloride.

3. A filler composition of claim 1, wherein said plastic spheres are electrically charged to provide a degree of attraction to surfaces of said ceramic spheres.

4. A filler composition of claim 1, wherein said plastic spheres cushion said ceramic spheres to minimize break up of said ceramic spheres during handling, mixing and casting of said filler composition.

5. A filler composition of claim 1, wherein said inorganic filler material is a mineral.

6. A filler composition of claim 5, wherein said mineral is $CaCO_3$.

7. A filler composition of claim 1, wherein said ceramic spheres have an average diameter of approximately 100 microns.

8. A filler composition of claim 7, wherein said ceramic spheres have an specific gravity of approximately 0.70 and a bulk density of 25 lbs/ft$^3$.

9. A filler composition of claim 6, wherein said composition comprises by weight:
 (1) approximately 70% to 80% of calcium carbonate;
 (2) approximately 17% to 27.5% of ceramic spheres;
 (3) approximately 2.5% to 3.0% of plastic spheres.

10. A filler composition of claim 9, wherein said composition comprises approximately 75% by weight of said $CaCO_3$. approximately 22% by weight of said ceramic spheres and approximately 3% by weight of said plastic spheres.

11. A filler composition of claim 9 or 10, wherein said $CaCO_3$ powder has a screen analysis on a percent retained cumulative basis of:
 40 mesh—0.13%
 50 mesh—3.08%
 60 mesh—8.95%
 70 mesh—16.30%
 100 mesh—13.67%
 200 mesh—54.42%
 325 mesh—74.30%.

12. A filler composition of claim 9 or 10, wherein said composition has a screen analysis on a percent retained cumulative basis of:
 30 mesh—0.039%
 40 mesh—0.43%
 50 mesh—5.80%
 60 mesh—14.76%
 70 mesh—24.50%
 100 mesh—33.94%
 200 mesh—66.16%
 325 mesh—90.71%.

13. A cast product comprising a filler composition of claim 1 admixed with a color pigment and set with a resin.

14. A cast product of claim 13, wherein said resin is an unsaturated polyester resin.

15. A cast product of claim 14 wherein inorganic filler material is a powdered calcium carbonate having granular elongate crystals, said crystals of calcium carbonate as bonded by said resin increasing tensile strength of said cast product.

* * * * *